United States Patent

Scherer et al.

[15] 3,681,422
[45] Aug. 1, 1972

[54] DIFLUOROCHLOROMETHYLARYL UREAS, THEIR PREPARATION AND USE AS HERBICIDES

[72] Inventors: Otto Scherer, Bad Soden/Taunus; Reinhard Hähnle, Hofheim/Taunus; Günter Schneider, Buchschlag, all of Germany

[73] Assignee: Farbwerke Hoechst Aktiengesellschaft vormals Meister, Lucius & Brüning, Frankfurt/Main, Germany

[22] Filed: Aug. 31, 1970

[21] Appl. No.: 68,539

Related U.S. Application Data

[63] Continuation of Ser. No. 650,606, July 3, 1967, abandoned.

[52] U.S. Cl..............260/453 R, 260/553 A, 71/120
[51] Int. Cl..............................................C07c 119/00
[58] Field of Search...................260/453 R; 71/120

[56] References Cited

UNITED STATES PATENTS 3,344,153  9/1967  Kühle et al....................260/453
3,079,244  2/1963  Scherer et al...................71/120
3,177,249  4/1965  Martin et al....................71/120
3,520,929  7/1970  Maravetz et al.................71/98
3,165,549  1/1965  Martin et al...................260/453

FOREIGN PATENTS OR APPLICATIONS 1,310,269  10/1962  France..........................260/453

OTHER PUBLICATIONS

Klauke, " Aliphatic Carbon Substituted Fluoro Isocyanates etc.," (1962) CA58 pp. 869- 870 (1963).

Primary Examiner—Lewis Gotts
Assistant Examiner—G. Hollrah
Attorney—Curtis, Morris & Safford

[57] ABSTRACT

General 3-difluorochloromethylaryl ureas of the general formula

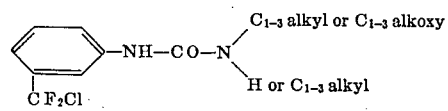

are useful as herbicides.

2 Claims, No Drawings

DIFLUOROCHLOROMETHYLARYL UREAS, THEIR PREPARATION AND USE AS HERBICIDES

This application is a continuation of parent application Ser. No. 650,606, filed July 3, 1967, now abandoned.

The present invention relates to novel difluorochloromethylaryl ureas, to a process for preparing them and to their use as herbicides.

Fluorine-containing aryl ureas having herbicidal properties are known, for example Fluometuron (N-3(trifluoromethyl)-phenyl-N',N'-dimethyl urea) and the corresponding methoxy derivative (N-3(trifluoromethyl)-phenyl-N'-methyl-N'-methoxy urea).

When the aforesaid compounds are used to control weeds occurring in cultivations of certain types of cereals or leguminosae damage to the cultivated plants cannot always be avoided.

The present invention provides novel 3-difluorochloromethylphenyl ureas of the general formula

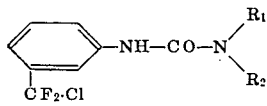

in which
R$_1$ stands for an alkyl or alkoxy radical each having one to three carbon atoms,
R$_2$ stands for hydrogen or an alkyl radical having one to three carbon atoms.

The compounds of the above general formula can be obtained by reacting 3-difluorochloromethylphenyl isocyanate with an appropriate alkylamine, dialkylamine, O-alkylhydroxylamine, or O,N-dialkylhydroxylamine, or by reacting 3-difluorochloromethylphenyl isocyanate with an appropriate O-alkylhydroxylamine, and subjecting the reaction product to a subsequent alkylation, or by reacting 3-difluorochloromethylphenyl isocyanate with an appropriate N-alkylhydroxylamine, and subjecting the reaction product to a subsequent alkylation, or by reacting 3-difluorochloromethylphenyl isocyanate with hydroxylamine and subjecting the reaction product to a subsequent dialkylation, or by reacting 3-difluorochloromethylphenyl carbamic acid chloride or fluoride with an appropriate alkylamine or O,N-dialkylhydroxylamine.

The present invention also provides herbicidal preparations containing as active ingredient one of the aforesaid novel compounds alone or in admixture with other biocidal agents, fertilizers, liquid or solid inert substances, surface-active substances, adhesive or dispersing agents, grinding auxiliaries or emulsifiers.

The reactions to obtain the novel compounds can be represented by the following schemes:

(A)

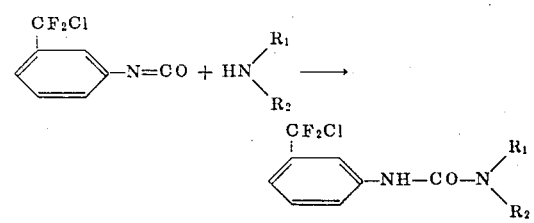

(B)
R$_1$=alkoxy:

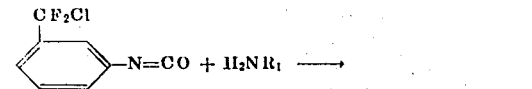

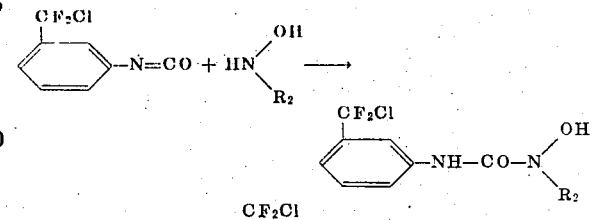

(C)
R$_1$=alkoxy:

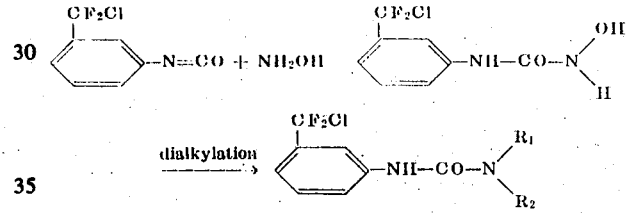

(D)
R$_1$=alkoxy:

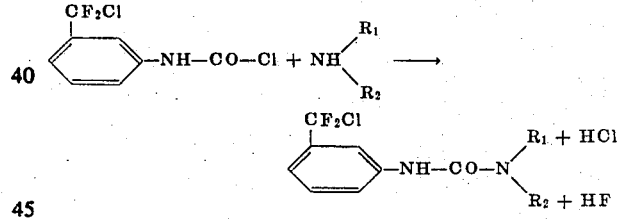

(E)

CF$_2$Cl
$\diagup\!\!\!\diagdown$—NH—CO—Cl + HN$\diagup^{R_1}_{R_2}$ ⟶

CF$_2$Cl
$\diagup\!\!\!\diagdown$—NH—CO—N$\diagup^{R_1}_{R_2}$ + HCl or (F)

CF$_2$Cl
$\diagup\!\!\!\diagdown$—NH—CO—F + HN$\diagup^{R_1}_{R_2}$

The reaction of the 3-difluorochloromethylphenyl isocyanate or the carbamic acid fluoride or chloride with the amine or the alkylated hydroxylamine is preferably carried out at a temperature below 50° C in the presence or absence of an inert diluent. Suitable diluents are, for example, benzene, toluene, petroleum ether, n-hexane, dioxane or dimethyl formamide.

The reaction of the 3-difluorochloromethylphenyl isocyanate with hydroxylamine is advantageously carried out in a two phase mixture consisting of water and an organic solvent immiscible with water, preferably in the presence of low molecular weight alcohols, suitably methanol, at a temperature below 40° C.

The alkylations are performed in known manner in an aqueous-alkaline suspension or in mixtures of aqueous alkali and an organic solvent. The alkali metal hydroxide solution and the alkylation agent are preferably added simultaneously with control of the pH value. Alternatively, the urea can be first introduced into the reaction vessel together with the alkylation agent in an organic solvent and the alkali metal hydroxide solution can then be added.

The reaction temperature depends on the reactivity of the alkylation agent used and ranges from 10° to 90° C.

Difluorochloromethylbenzene or 3-difluorochloromethylbenzoic acid fluoride is obtained by fluorination of benzotrichloride or 3-trichloromethyl-benzoic acid chloride, respectively. 3-Difluorochloromethylphenyl isocyanate can be obtained by decomposition via the 3-difluorochloromethylbenzoic acid azide.

The alkylations in reactions B, C, and D are carried out with dialkyl sulfates, alkyl halides and alkyl-toluene sulfates.

The novel 3-difluorochloromethylphenyl ureas are obtained in good yields and are crystalline compounds. In most cases they can be used as they are obtained. However, they may be further purified by recrystallization from the usual organic solvents.

It has been found that the novel substances have a good herbicidal action which approximately equals that of the known fluorine-containing aryl ureas, but that their non-phytotoxic properties with respect to a series of cultivated plants are much better. This is surprising. Among the numerous N-aryl-N',N'-monoalkyl ureas and dialkyl ureas known as herbicides active substances containing a $CF_2Cl$ group have not yet been described.

The novel compounds can be used for combating various weeds in cultivations of useful plants in the form of the usual formulations, whereby the cultivated plants are substantially spared. The formulations can be varied within a wide range with respect to the inert components for dusts, granules or liquid preparations, as well as in the use of wetting agents, adhesives, dispersing agents, and if necessary, grinding auxiliaries.

The novel compounds can also be mixed with fertilizers whereby agents are obtained having a fertilizing and herbicidal action at the same time.

The following examples serve to illustrate the invention but they are not intended to limit it thereto.

EXAMPLE 1

N-3-difluorochloromethylphenyl-N',N'-methoxymethyl urea

Thirty grams (0.5 mole) of O,N-dimethylhydroxylamine in 50 milliliters of petroleum ether were added dropwise at room temperature to 102 grams (0.5 mole) of N-3-difluorochloromethylphenyl isocyanate in 500 milliliters of petroleum ether. The reaction mixture was stirred for 2 hours at room temperature, the liquid phase was drawn off by suction and the solid reaction product was covered with petroleum ether. The precipitate was recrystallized from n-hexane. One hundred and eighteen grams of the above urea derivative were obtained (89 percent of the theory) having a melting point of 68°–70° C.

EXAMPLE 2

N-3-difluorochloromethylphenyl-N',N'-diisopropyl urea

Thirty-four grams (0.336 mole) of diisopropylamine were added dropwise at room temperature to 68 grams (0.334 mole) of N-3-difluorochloromethylphenyl isocyanate in 200 milliliters of petroleum ether. The reaction mixture was stirred for one hour, filtered off with suction and the solid reaction product was covered with petroleum ether. The precipitate was recrystallized from n-hexane. 91 grams of the above urea derivative (89.5 percent of the theory) were obtained having a melting point of 137°–140°C.

EXAMPLE 3

N-3-difluorochloromethylphenyl-N'-methyl urea

One hundred and fifty-four grams (0.76 mole) of N-3-difluorochloromethylphenyl isocyanate were added at room temperature, while cooling with methylene chloride and $CO_2$, to 31 grams (1.0 mole) of monomethylamine. The amine in excess was eliminated under reduced pressure. One hundred and thirty-one grams of the above urea derivative (85 percent of the theory) were obtained having a melting point of 80°–82° C. The compound can be recrystallized from a mixture of methanol and water.

EXAMPLE 4

N-3-difluorochloromethylphenyl-N',N'-dimethyl urea

Gaseous dimethylamine was introduced, at 25° C while cooling, into 102 grams (0.5 mole) of N-3-difluorochloromethylphenyl isocyanate. The precipitate was filtered off with suction and freed from solvent residues under reduced pressure. 96 grams of the above urea derivative (77 percent of the theory) were obtained having a melting point of 156° C.

EXAMPLE 5

N-3-difluorochloromethylphenyl-N',N'-di-n-propyl urea

Fifty-six grams (0.5 mole) of di-n-propylamine in 50 milliliters of diethyl ether were added dropwise, at 10° C and while cooling, to 102 grams (0.5 mole) of N-3-difluorochloromethylphenyl isocyanate in 200 milliliters of diethyl ether. The reaction mixture was treated as described in the preceding examples whereby 115 grams (75 percent of the theory) of the above urea derivative were obtained, having a melting point of 66° C.

EXAMPLE 6

The weeds
| | |
|---|---|
| wild mustard | *Sinapis arvensis* |
| fat hen | *Chenopodium album* |
| chickweed | *Stellaria media* |
| and | *Echinocloa crus-galli* | and the cultivated plants
| | |
|---|---|
| spring wheat | *Triticum aestatis* |
| common oat | *Avena sativa* |
| green pea | *Pisum sativum* |
| small onion | *Allium cepa* | where sown or set in plastic boxes filled with humus sandy loam. On the day of sowing the soil was treated with aqueous suspensions of so-called wettable powders of A = N-3-difluorochloromethylphenyl-N',N'-dimethyl urea and B = N-3-difluorochloromethylphenyl-N'-methyl urea, respectively.

As comparative substance

C = N-3-trifluoromethylphenyl-N',N'-dimethyl urea (fluometuron) was used and applied in the same manner as the claimed compounds.

The wettable powders had the following composition:

25 percent of the respective active ingredient 64 percent of silicic acid preparation as inert substance 10 percent of dried cellulose sulfite waste liquor as dispersing agent 1 percent of wetting agent The boxes were placed in a hotbed and the results were evaluated 6 weeks after the treatment.

The following table is a summary of the results obtained. The amounts applied are given in kilograms of active ingredient per hectare and the effects of the herbicides are indicated in degrees of damage in percent, i.e. 100 means total destruction of the plants whereas O indicates that the plants were not at all damaged.

1. Weeds

|   | kg of active ingredient per hectare | | kg of active ingredient per hectare | |
|---|---|---|---|---|
|   | 1,25 | 0.625 | 1.25 | 0.625 |
|   | Sinapis arvensis | | Chenopodium album | |
| A | 100 | 90 | 100 | 80 |
| B | 90 | 70 | 100 | 70 |
| C | 100 | 95 | 75 | 60 |
|   | Stellaria media | | Echinocloa crus-galli | |
| A | 100 | 90 | 100 | 90 |
| B | 100 | 60 | 45 | 30 |
| C | 100 | 90 | 100 | 100 |

2. Cultivated plants

|   | kg of active ingredient per hectare | | kg of active ingredient per hectare | |
|---|---|---|---|---|
|   | 1.25 | 0.625 | 1.25 | 0.625 |
|   | Triticum aestatis | | Avena sativa | |
| A | 0 | 0 | 10 | 0 |
| B | 0 | 0 | 0 | 0 |
| C | 95 | 80 | 100 | 70 |
|   | Allium cepa | | Pisum sativum | |
| A | 20 | 20 | 10 | 0 |
| B | 0 | 0 | 0 | 0 |
| C | 60 | 50 | 65 | 20 |

The evaluation of the test revealed that the novel compounds had approximately the same herbicidal effect as the comparative substance fluometuron, but that they were distinctly safer for the cultivated plants.

With the lowest amount applied, the herbicidal effect was still satisfactory in general, whereas double the amount applied of compounds A and B did no significant harm to the cultivated plants, which fact is rather important in practice for excess concentrations may always occur, either by false dosage or by crossing tracks during spraying.

EXAMPLE 7

In order to test the effectiveness and selectivity of compounds A and B of Example 1 also on the open field dwarf-bush beans were sown at the beginning of May on plots having a size of 20 square meters. One day after sowing the specified compounds and the comparative compound were applied in the form of wettable powders suspended in water. In this case, too, fluometuron was used as preparation C.

The active ingredients were applied in an amount of 1 kilogram per hectare suspended in 600 liters per hectare. The test was carried out four times and the test results were evaluated 4 weeks after the treatment as to the herbicidal effect and the damage on the cultivated plants. The results are summarized in the following table

| cultivated plant | A | B | C |
|---|---|---|---|
| dwarf-bush bean | 0 | 10 | 90 |
| weeds | | | |
| Chenopodium album | 80 | 80 | 90 |
| Senecio vulgaris | 80 | 80 | 60 |
| Polygonum convolvulus) | 100 | 100 | 100 |
| Polygonum persicaria) | | | |
| Galinsoga parviflora | 100 | 100 | 90 |

The herbicidal effect of all three preparations was approximately equal, however, the compounds according to the invention were clearly safe for the dwarf-bush beans, whereas the comparative substance fluometuron strongly damaged the beans so that many of the plants perished.

What is claimed is:

1. 3-difluorochloromethylphenyl urea of the formula

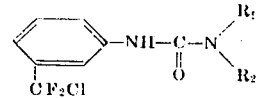

in which $R_1$ stands for an alkoxy radical having one to three carbon atoms, $R_2$ stands for hydrogen or an alkyl radical having one to three carbon atoms.

2. A compound as claimed in claim 1, in which $R_1$ stands for a methoxy radical and $R_2$ is a methyl radical.

* * * * *

UNITED STATES PATENT OFFICE
CERTIFICATE OF CORRECTION

Patent No. 3,681,422          Dated  August 1, 1972

Inventor(s)  Scherer et al.

It is certified that error appears in the above-identified patent and that said Letters Patent are hereby corrected as shown below:

In the Heading:

Under "[21] Appl. No.: 68,539"

insert --[30] Foreign Application Priority Data

July 22, 1966  Germany  F 49 761 and F 49 762--.

Signed and sealed this 2nd day of January 1973.

(SEAL)
Attest:

EDWARD M. FLETCHER, JR.                ROBERT GOTTSCHALK
Attesting Officer                       Commissioner of Patents